United States Patent
Albahari et al.

(10) Patent No.: US 8,024,711 B2
(45) Date of Patent: Sep. 20, 2011

(54) SOFTWARE ANALYSIS TOOL

(75) Inventors: Benjamin Albahari, Seattle, WA (US);
Bruce E. Johnson, Bellevue, WA (US);
Fernando L. Fanton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 11/201,019

(22) Filed: Aug. 10, 2005

(65) Prior Publication Data

US 2007/0038974 A1    Feb. 15, 2007

(51) Int. Cl.
*G06F 9/44* (2006.01)
*G06F 9/45* (2006.01)

(52) U.S. Cl. ........ 717/127; 717/128; 717/130; 717/131; 717/158

(58) Field of Classification Search ............. 717/127, 717/128, 130, 131, 158; 709/226
See application file for complete search history.

(56) References Cited

U.S. PATENT DOCUMENTS

| | | | |
|---|---|---|---|
| 6,199,195 B1 * | 3/2001 | Goodwin et al. | 717/104 |
| 6,952,820 B1 * | 10/2005 | Schultz et al. | 717/151 |
| 6,971,085 B1 * | 11/2005 | Alcorn | 717/108 |
| 7,093,234 B2 * | 8/2006 | Hibbeler et al. | 717/124 |
| 7,181,438 B1 * | 2/2007 | Szabo | 707/2 |
| 7,568,190 B2 * | 7/2009 | Creamer et al. | 717/148 |
| 2004/0268346 A1 * | 12/2004 | Jun | 717/177 |
| 2006/0075386 A1 * | 4/2006 | Loh et al. | 717/124 |
| 2006/0236309 A1 * | 10/2006 | George | 717/133 |
| 2007/0011330 A1 * | 1/2007 | Dinker et al. | 709/226 |

OTHER PUBLICATIONS

Berg, et al. "Fast Data-Locality Profiling of Native Execution", 2005, ACM, p. 169-180.*
Harkema, et al. "Performance Monitoring of Java Applications", 2002, ACM, p. 114-127.*

* cited by examiner

*Primary Examiner* — Wei Zhen
*Assistant Examiner* — Qamrun Nahar
(74) *Attorney, Agent, or Firm* — Wolf, Greenfield & Sacks, P.C.

(57) ABSTRACT

A tool for analyzing software. The tool identifies calls to framework components made from within one or more application programs. The information may be processed to indicate usage of framework components. This usage information may be aggregated over a pool of application programs to derive statistical usage information for each component in the framework, allowing components to be selected for inclusion in a compact framework. Usage information may also be used for scheduling development tasks so that the most widely used framework components are developed first or to estimate the amount of development required to modify an application program for execution against a target framework.

18 Claims, 5 Drawing Sheets

FIG. 5

SOFTWARE ANALYSIS TOOL

BACKGROUND OF INVENTION

Software is widely used to control traditional desktop computers as well as many other electronic devices with processors. For example, many portable electronic devices contain processors that are programmed to perform a wide array of functions. While many portable devices are programmed to perform communication or personal entertainment functions that are not traditionally performed by desktop computers, it is often desirable for the portable electronic devices to perform many of the same functions that are performed by traditional desktop computers.

Though a full function portable electronic device is desirable, resource constraints can limit the functions that a portable electronic device can be programmed to perform. As a result, some programs and programming systems may have "compact" versions that are adapted for execution on portable electronic devices.

One example of a compact version of a programming system is the compact "framework" for .NET programs. A .NET framework is provided by Microsoft of Redmond, Wash., USA and is loaded on a device, enabling that device to execute application programs developed to execute under the framework.

Each application program contains instructions that can use methods, properties and events that are recognized by the .NET framework. These instructions are represented in what is sometimes referred to as "Intermediate Language." The intermediate language is not directly executable on a processor but may be derived by partially compiling source code to resolve references to variables, convert high level expressions in the source code into groups of lower level instructions recognized by the framework and to otherwise simplify the code so that it can be more easily executed.

The application program is executed using a series of calls from the intermediate language instructions to classes or libraries created by the user or third parties or to components of the framework. Because the framework is written in machine code that can be executed by the processor, when a call is made to a component of the framework, the framework performs the desired methods and implements the required properties or events.

It is often desirable for the same application program to execute either on a desktop computer or a portable device. If the framework on the portable device implements the same methods, properties and events as the framework on the desktop computer, a single application program could be prepared for either. However, resource constraints on the portable electronic device sometimes preclude the full framework from being implemented on the portable electronic device.

SUMMARY OF INVENTION

In one aspect, the invention relates to a tool for analyzing software that executes in a framework. The tool identifies call instructions in the software under analysis that are calls to the framework.

In another aspect, the invention may be regarded as a method of creating a compact framework, which could be performed with the tool. In such a method, a set of application programs is processed to determine a statistic relating to use of each of a plurality of framework components. These statistics may be used to select framework components for inclusion in a compact framework.

In other aspects, the invention may be regarded as a computer-readable medium containing either computer-executable instructions that perform acts, which could be associated with operation of the tool, or a data structure containing data, which could be created with the tool.

The foregoing summary is not a limiting description of the invention, which is defined by the claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure 5:
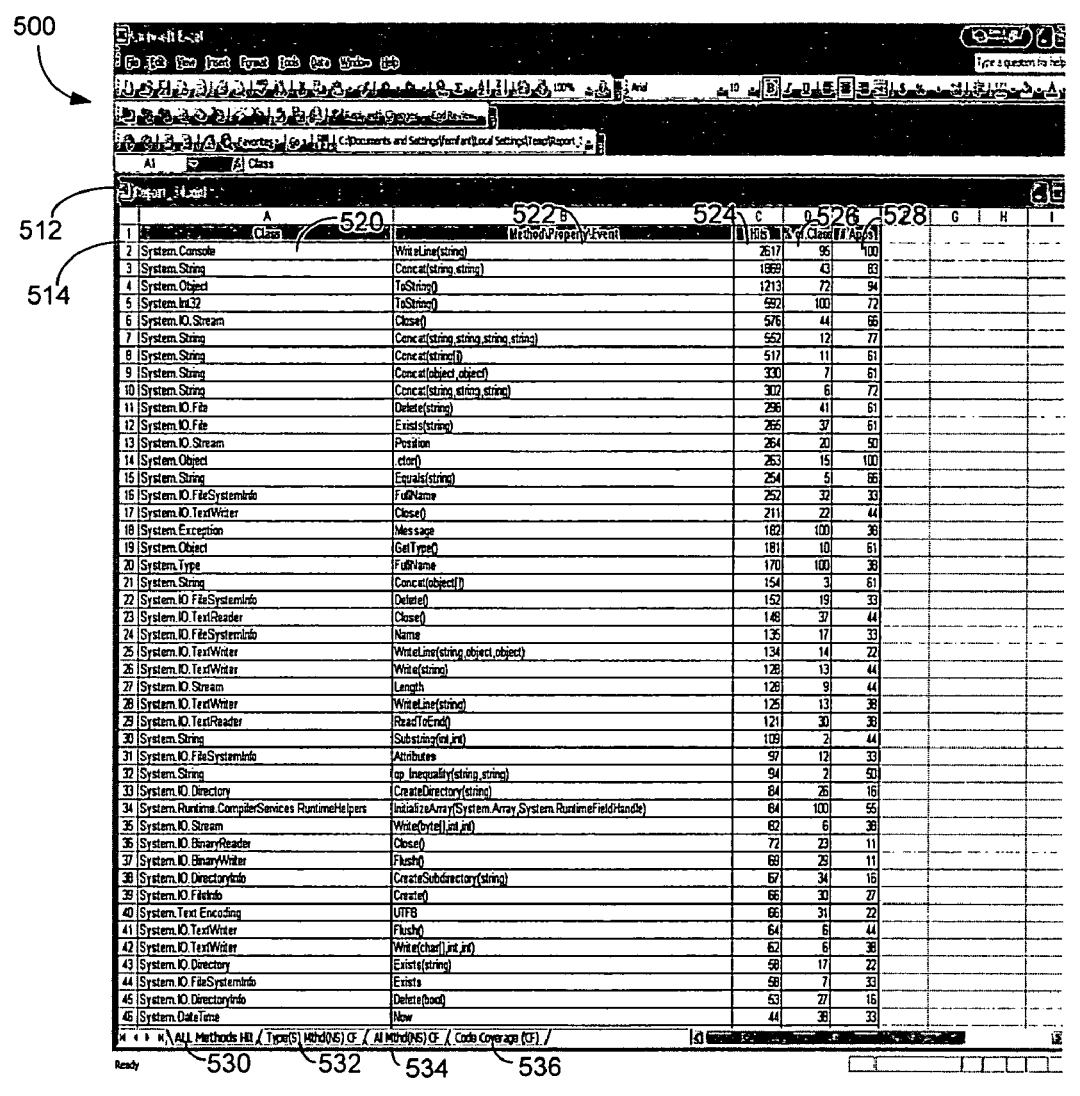

FIG. 5 is a sketch of a computer display of the output of tool 300.

DETAILED DESCRIPTION

To facilitate analysis of programs that are executed by a framework, we have invented a software analysis tool. The tool can analyze one or more programs intended for execution by a framework to identify calls to the framework. The tool may record or process this information in one or more ways for one or more purposes.

The specific processing performed by the tool may differ depending on the intended application of the tool. When used as an aid to the construction of a compact version of the framework, the tool may collect statistical information about the usage of components of the framework, such as namespaces, classes, methods, properties or events.

Based on this information, the compact framework may be constructed by selecting components of the framework that are used frequently. Such a compact framework may be well suited for use in a portable electronic device because it may require fewer resources than the full framework. Nonetheless, such a framework is likely to execute programs developed for desktop computers or other devices containing the full framework without modification or without significant modification.

The tool may additionally or alternatively provide information useful in planning projects to port application programs developed to execute on a baseline framework to another target framework. The information produced by the tool can identify framework components used within the application program to be ported which either need to be added to the target framework or removed from the application program. By identifying tasks that need to be performed to port the application program, the level of effort may be more easily estimated, thereby facilitating project planning.

Figure 1:
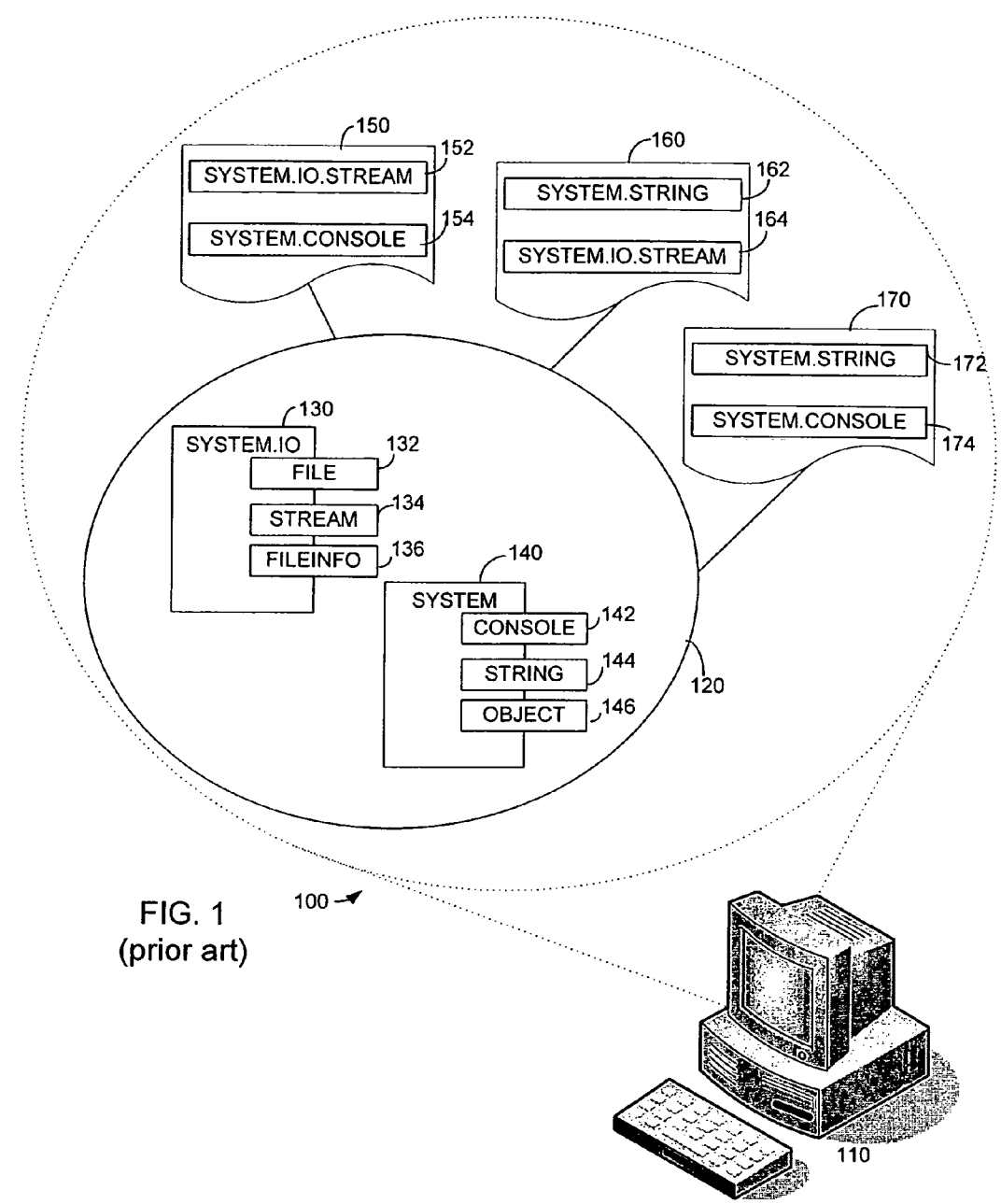
FIG. 1 is a sketch of a prior art desktop program environment.

An example of use of such a tool is provided in connection with FIG. 1. FIG. 1 illustrates a program environment 100 that may be used to execute programs developed to execute against a framework. The program environment may be created on any suitable device with a processor. In the illustrated embodiment, the device is a desktop computer 110 that has sufficient resources to execute a full framework.

Program environment 100 includes framework 120. Framework 120 may be the .NET framework, available from Microsoft, Inc. of Redmond, Wash., USA, but any suitable framework may be used. Framework 120 is stored in a computer-readable medium associated with the processor on which program environment 100 executes.

Framework 120 includes multiple namespaces. In this example, namespaces 130 and 140 are illustrated, but an actual framework may contain many namespaces. Each namespace 130 and 140 may be created using computer-executable instructions and may contain one or more classes having framework components, such as methods, properties or events. In the illustrated embodiment, SYSTEM.IO namespace 130 includes classes, such as FILE class 132, STREAM class 134 and FILEINFO class 136, that provide access to framework components in namespace 130. Similarly, SYSTEM namespace 140 includes classes, such as CONSOLE class 142, STRING class 144 and OBJECT class 146, that provide access to framework components in namespace 140.

Frameworks for use in devices such as desktop computers are known in the art. Framework 120 may be any suitable framework and may contain more, different or fewer namespaces and classes than illustrated in FIG. 1.

Application programs represented in an intermediate language compatible with framework 120 may also be included in program environment 100. Neither the number of such application programs nor the specific functions performed by such programs is a limitation on the invention. As one example, application programs 150, 160 and 170 may be data processing applications, such as a word processor or a spreadsheet program, or may be personal entertainment programs, such as applications that play music or display video.

In the illustrated embodiment, each of the application programs 150, 160 and 170 is expressed in the MSIL intermediate language. These programs may be prepared using known techniques for preparing application programs, including compiling source code programs into MSIL. Each of the application programs 150, 160 and 170 may include one or more instructions that make calls to framework 120. Each call to framework 120 is, in this example, through a class provided by one of the namespaces that forms framework 120.

In this example, application program 150 includes call 152, which is made through class 134, and call 154, which is made through class 142. Application program 160 includes call 162, which is made through class 144, and call 164, which is made through class 134. Application program 170 includes call 172, which is made through class 144 and call 174, which is made through class 142. Using these interfaces, each of the application programs may access portions of the framework 120 as it executes.

It may be desirable for the application programs 150, 160 and 170 to execute in a different program environment. For example, it may be desirable to execute those same programs in a program environment on a portable electronic device.

Figure 2:
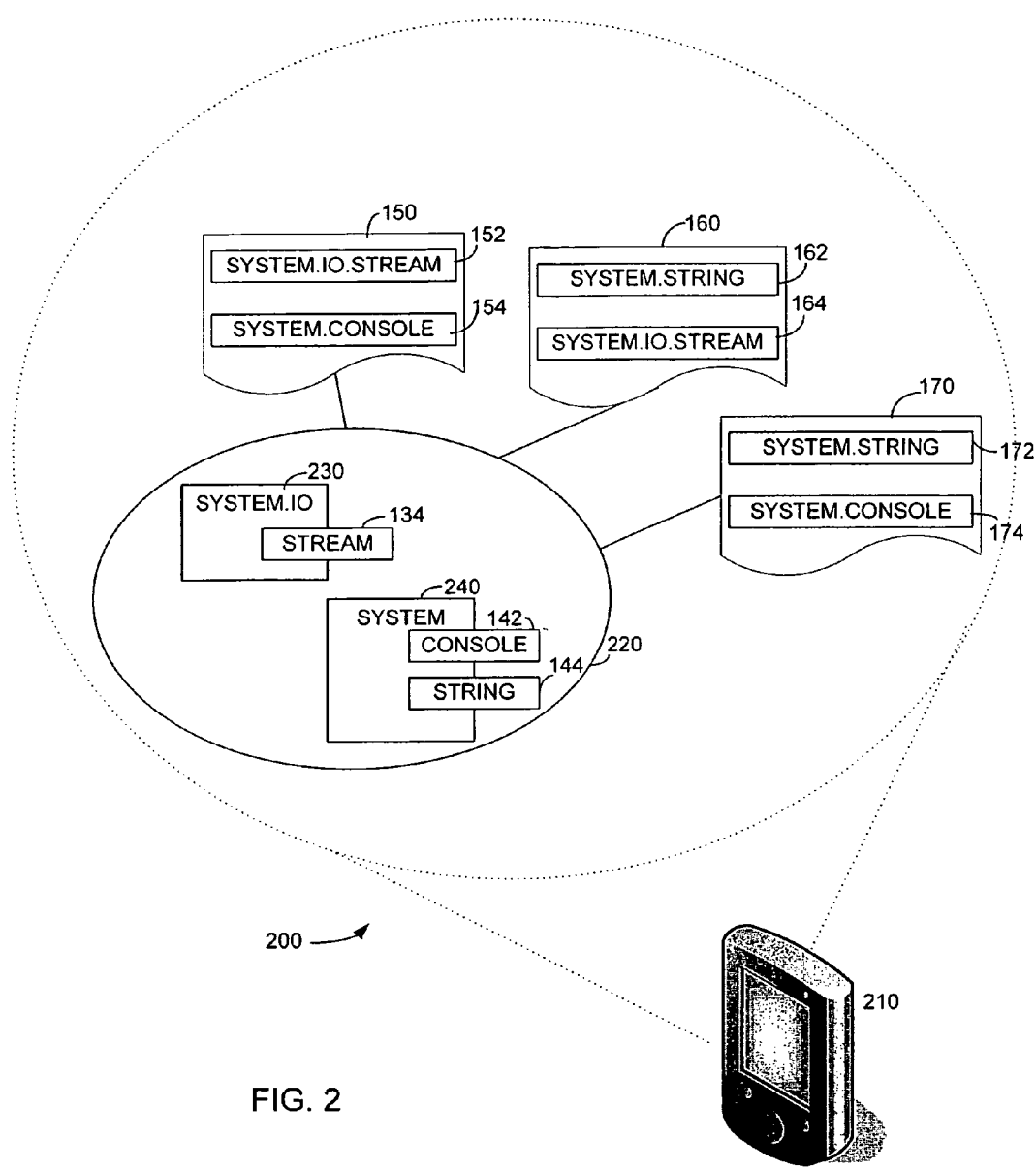
FIG. 2 is a sketch of a program environment on a portable electronic device with a compact framework formed according to an embodiment of the invention.

FIG. 2 illustrates a program environment 200 that may exist on a portable electronic device 210, which could be a PDA, a smart phone, a pocket PC or other similar device. In this embodiment, portable electronic device 210 is resource constrained and program environment 200 includes compact framework 220 to operate with the constrained resources of portable electronic device 210.

In this embodiment, compact framework 220 includes some, but not all, of the components of framework 120. In the illustrated embodiment, compact framework 220 includes namespaces 230 and 240. As with namespaces 130 and 140, namespaces 230 and 240 may be implemented with computer-executable instructions. The computer-executable instructions may be stored in computer-readable medium associated with portable electronic device 210. Compact framework 220 is deemed "compact" because it consumes less resources than framework 120. This reduction in resource usage may result from compact framework 220 having fewer namespaces than framework 120 and/or having fewer framework components within some or all of its namespaces. In this example, namespace 230 includes class 134 as in namespace 130, but does not provide a class comparable to class 132 or 136. Similarly, namespace 240 provides interfaces 142 and 144 as in namespace 140, but does not provide a class 146.

According to one embodiment of the invention, the components of compact framework 220 are selected to allow applications that execute in program environment 100 to execute in program environment 200 with little or no modification. The components of compact framework 220 are selected in an automated or semi-automated fashion using a tool.

Figure 3:
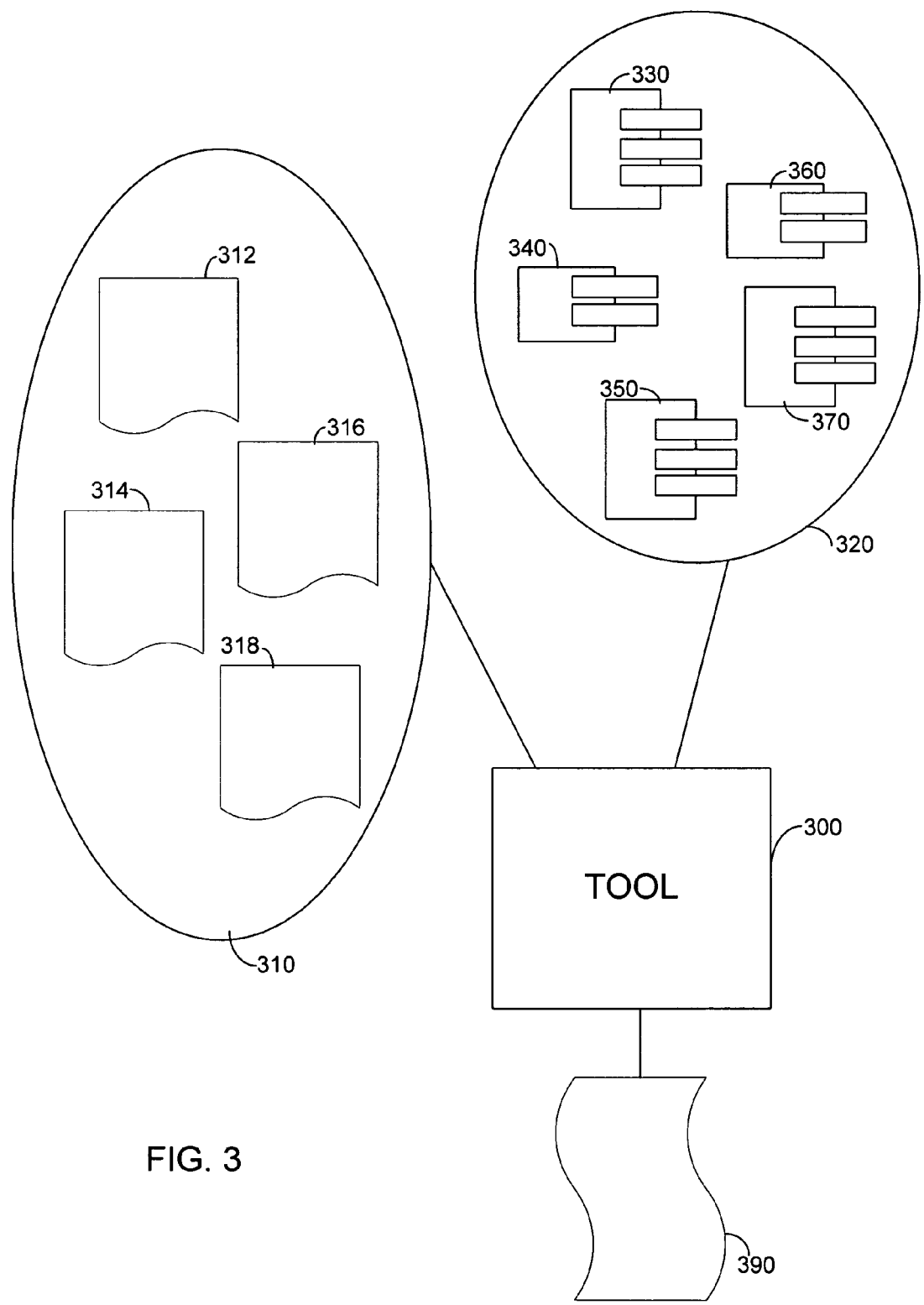
FIG. 3 is a sketch of a development environment according to an embodiment of the invention.

FIG. 3 illustrates a development environment in which tool 300 may be operated as part of the process of constructing compact framework 220. In one embodiment, tool 300 is implemented as a plurality of computer-executable instructions stored on computer-readable medium of a computer work station (not shown) on which tool 300 is executed. Tool 300 may be written in C++ or any other suitable language. However, the precise implementation of tool 300 is not critical to the invention.

The development environment of FIG. 3 includes a pool 310 of one or more target applications. In the example illustrated, pool 300 includes target applications 312, 314, 316 and 318, though any number of target applications may be included. The target applications in pool 310 may be applications intended to execute on a framework under development. Alternatively, target applications may be selected for inclusion in pool 310 in any suitable way, such as selecting a set of applications representative of the applications that may be executed on the framework under development.

In the illustrated embodiment, each of the target applications contains instructions that execute on a baseline framework 320. In operation, each target application may access framework components, such as namespaces, classes, methods, properties or events, within baseline framework 320. Here, baseline framework 320 includes multiple namespaces, such as namespaces 330, 340, 350, 360 and 370. Each of the namespaces within baseline framework 320 provides interfaces through which calls may be made from the target applications to the components of baseline framework 320.

To create a compact framework in which the target applications may execute without modification or with few modifications, it is desirable for the compact framework to include either all of the framework components in baseline framework 320 accessed by any of the target applications in pool 310 or as many of the frequently used framework components as possible. Tool 300 may determine which framework components are used by target applications in pool 310, which components are most frequently used by the target applications and/or statistical parameters relating to usage by the target applications.

This information may be output by tool 300 in any suitable way. In the illustrated embodiment, tool 300 forms output 390. Output 390 may be a data file or other computer artifact holding one or more data structures. Alternatively, output 390 could be provided on a paper printout or on a computer display screen.

In operation, tool 300 examines each of the target applications in pool 300, identifies calls to the baseline framework 320 and then records information concerning usage of the baseline framework components. The operation of tool 300 is illustrated in greater detail in connection with FIG. 4, below. A sample output of tool 300 is illustrated in FIG. 5.

Figure 4:
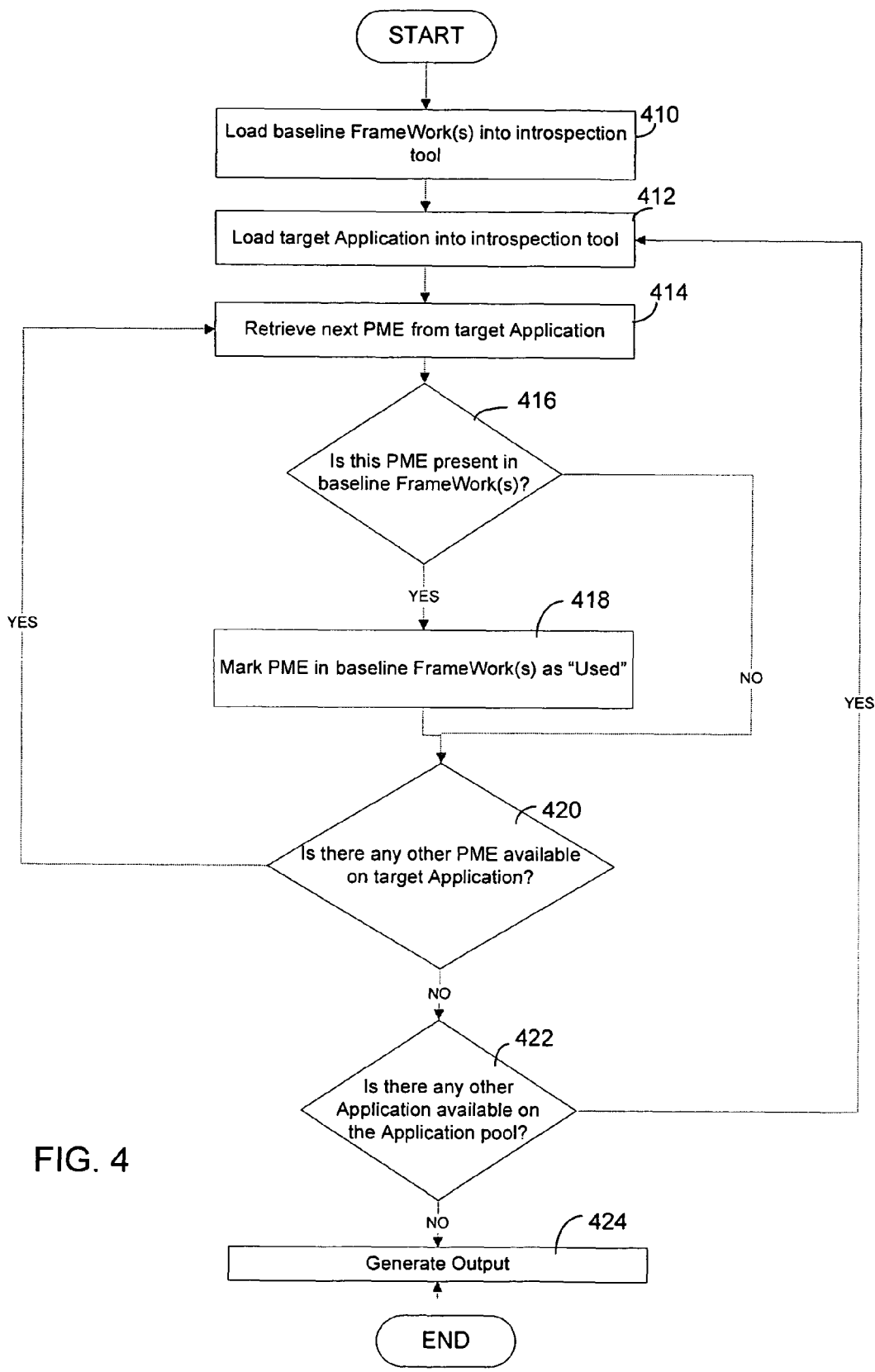
FIG. 4 is a flow chart of a method of operating tool 300 of FIG. 3.

FIG. 4 shows a flowchart of a process by which tool 300 may operate according to one embodiment of the invention. The process begins at block 410. At block 410, the baseline framework 320 is loaded into tool 300. Tool 300 may be constructed to operate as an introspection tool or may contain an introspection tool. An "introspection tool" is a tool that can examine a software component to identify details of the internal construction of the software component, such as calls or other references to external components made from within the software component.

Introspection tools are known in the art. Such tools may operate by parsing the intermediate language of the target applications and identifying references to external components based on the intermediate language representation. However, a tool operating according to any suitable principle may be used and an introspection tool as known in the art may be used to construct tool 300.

At block 412 a target application from pool 310 is loaded into the introspection tool. In the described embodiment, each of the target applications within pool 310 is processed sequentially, but the order of processing is not significant in the invention. Accordingly, any suitable means for selecting one of the target applications in pool 310 may be used.

As described above, a baseline framework and target application are "loaded" into the introspection tool. Loading may be achieved by copying the baseline framework and target application into memory reserved for use by the introspection tool. However, any suitable means of selecting and making available for processing the baseline framework and a target application may be used to "load" the information. For example, the information may be loaded by providing a pointer to information stored on disk.

After a baseline framework and target application are loaded, the process continues at block 414. At block 414 the output of the introspection tool is examined. Each reference in the target application to an external component of the type that may be implemented in the baseline framework is considered. In the illustrated embodiment, the baseline framework provides properties, methods, and events that may be called from within the target application programs. Accordingly, at block 414, each reference from within the target application loaded at block 412 to a property, method, or event external to that target application is considered.

At block 414, such references to a property, method or event are selected for consideration one at a time, resulting in each such reference being considered sequentially in the process of FIG. 4. The order in which the references are considered is not critical to the invention. Accordingly, block 414 may use any suitable method to select a specific reference to a property, method or event for consideration.

Once a property, method or event is selected, processing continues to decision block 416. At decision block 416, a comparison is made between the selected property, method or event and the properties, methods and events within the baseline framework. If the selected property, method or even is not contained within the baseline framework, processing continues to decision block 420. Conversely, if the selected property method or event is a component of the baseline framework processing continues to block 418.

At block 418, the selected property, method or event is indicated to be "used" within the target application. The indication may be made in any suitable way. For example, tool 300 may construct a data structure in computer memory with records associated with each framework component. Such records may include a Boolean field that may be set at block 418 to indicate that the framework component is used in processing of any of the target applications.

In other embodiments, more detailed information concerning the use of each framework component may be recorded at block 418. For example, block 418 may add records to a data structure, with each record identifying a baseline component and the context in which that component is used. The record may indicate the target application that used the baseline component. Such a record could alternatively or additionally store an indication of the class within the target application from which the baseline component was referenced.

Once the information concerning a specific use of a framework component is recorded at block 418, processing continues to decision block 420. At decision block 420 a determination is made whether the introspection tool identified additional references to properties, methods or events that have not been processed. If further references remain to be processed, the process of FIG. 4 loops back to block 414. At block 414 the next reference to a property, method or event is selected for processing. Processing then continues with decision block 416, block 418 and decision block 420 being repeated for each reference to a property, method or event within the target application. This loop repeats until each reference is processed, resulting in a record made for one specific target application for each use of a property, method or event from the baseline framework.

Once those records are made, processing proceeds from decision block 420 to decision block 422. At decision block 422 a determination is made whether there are additional target applications in pool 310. If further applications remain for processing, the process of FIG. 4 loops back to block 412 where the next target application is loaded into the introspection tool.

Processing of the next targeted application is then fully performed in block 414, decision block 416, block 418 and decision block 420. Upon completion of the processing of the next target application, the data structure formed at block 418 will also reflect usage of components of the baseline framework within that target application. Decision block 422 will cause processing to repeatedly loop back to block 412 until all target applications within pool 310 are processed. Thereafter, the process continues to block 424.

At block 424, the information on usage of framework components in the target applications within pool 310 may be used to generate output 390. The processing performed at block 424 may depend on the desired format of output 390 and the format in which information on usage is stored at block 418. For example, if processing at block 418 simply marks Boolean fields associated with components in the baseline framework as used, generating output at block 424 may involve creating a list containing those baseline components associated with Boolean fields marked as used.

In an alternative embodiment, processing at block 424 may involve aggregation of information stored at block 418. For example, if block 418 creates a record for each usage of a property, method or event, processing at block 424 may involve counting the number of records indicating that each property, method or event was used. Alternatively, processing may involve identifying the number of target applications that used each property, method or event. As an example of further processing that may be performed at block 424, statistical properties concerning usage may be computed. Such statistical usage information, may include, for example, the percentage of the target applications that utilize a particular component of the baseline framework.

Block 424 may store the generated information in any suitable form. In the illustrated embodiment, the data is stored as an XML file. Such a file contains tags identifying fields storing data. Such a file may conveniently store information about multiple components of the baseline framework.

FIG. 5 illustrates a graphical user interface 500 that may be used to display output 390. In this example, the XML file is displayed using a spreadsheet program that populates columns such that all data of the same type is displayed in the same column. In the illustrated embodiment, a display area 512 is created on use of interface 500. Display area 512 includes multiple rows, such as row 514. Each row presents information on one component of the baseline framework under analysis. Each row contains multiple fields, with each field representing a different type of information.

In the example of FIG. 5, fields 520 and 522 collectively define the framework component about which data is provided in row 514. Field 520 describes the class within the baseline framework in which the component is defined. Field 522 provides the name of the class through which that component is accessed. Such fields are appropriate in the illustrated embodiment in which framework components are accessed though interfaces provided by namespaces within the framework. Where other means are used to access components of the framework, other means of identifying the components may be used. Other rows contain similar fields storing similar information.

In the example of FIG. 5, usage information is provided in multiple forms for each component of the baseline framework. In this example, fields 524, 526, and 528 all provide different statistics of use. Field 524 provides a count of the total number of times the framework component identified in fields 520 and 522 was accessed from within the target applications of pool 310. Field 526 provides a percentage of the total number of namespaces contained within the target applications in pool 310 that accessed the framework component identified on fields 520 and 522. Field 528 provides a count of the number of target applications within pool 310 that accessed the framework component identified in fields 520 and 522.

FIG. 5 illustrates one way in which data collected by tool 300 may be displayed. In this embodiment, display area 512 includes tabs 530, 532, 534, and 536. Each tab, when selected through graphical user interface 500, presents a different display of the data. The illustration of FIG. 5, tab 530 is selected, causing a display of usage information for all components of the baseline framework. Tabs 532 and 534, when selected, produce a display of usage information for only a subset of the components in the baseline framework. The subsets may be defined in any suitable way and may be selected based on the intended application of the output 390.

Tab 536, when selected, causes data to be displayed in an alternative format. In this example, selection of tab 536 causes data concerning usage to be displayed only for those baseline components that are not included in a compact framework. In this embodiment, the process depicted in FIG. 4 may be modified to generate the required information. Block 410 may be modified to load a compact framework in addition to a baseline framework. Block 418 may also be modified to separately record, for each baseline component that is used, whether the component is also in the compact framework.

The various forms of output may be used in multiple ways, including in software development. For example, the display associated with tab 530 showing usage of all components of the baseline framework may be used to select components for inclusion in a compact framework. As illustrated in FIG. 5, the spreadsheet program displaying output 390 has been used to sort the rows based on the number of times each component within the framework is referenced in the target applications within pool 310. Framework components appearing at the top of such a list may be selected for inclusion in a compact framework. Components appearing at the bottom of such a list or not appearing on the list may be selected for omission from the compact framework.

As another example of how the output 390 may be used, information as displayed by selection of tab 536 may be used to plan work needed to execute the target application within pool 310 on a compact framework created from baseline framework 320. Because the portions of target applications using framework components that are not included in the compact framework must be rewritten to run on the compact framework, the list provided when tab 536 is selected provides an indication of rework needed for target applications within pool 310 to execute in the compact framework.

Having thus described several aspects of at least one embodiment of this invention, it is to be appreciated that various alterations, modifications, and improvements will readily occur to those skilled in the art.

For example, the invention was illustrated in connection with a compact .NET framework. However, the invention is not limited to that embodiment. The invention may be used with other frameworks, such as a JAVA® virtual machine or other frameworks provided by what are sometimes referred to as an interpreter or a just in time compiler. Different frameworks may include components that are commonly described with terms different than those commonly used to describe .NET components. Accordingly, names of components are used herein in a generic sense. For example, a component described as a "container" or a "package" may be examples of "namespaces." Likewise, a component described as a function or a procedure may be examples of "methods."

As another example, a single baseline framework is illustrated in FIG. 3. A baseline could be formed by multiple frameworks. In such an embodiment, a compact or other target framework could be created to replace multiple baseline frameworks, allowing programs developed for any of the baseline frameworks to execute on the target framework.

Further, a tool was described as useful for selecting framework components in a compact framework. The same tool may be used to prioritize development projects, such that the most frequently used framework components are implemented first.

Moreover, the tool may be used with any target framework and is not limited to situations in which the target framework is a compact version of the baseline framework. As one example, the target framework could be in a separate program environment, such as may occur when code prepared for the JAVA framework is ported to be .NET framework.

Alternatively, the tool may be used to estimate the level of effort required to prepare "or port" an application program to execute in a particular framework, called the "target framework." When used for this purpose, the application to be ported may be the only application in pool 310. A report generated by the tool indicates framework components used by such an application, which may then be compared to the components in the target framework. By identifying the framework components used by the application that are not in the target framework, the number of framework components that need to be created or the number of places where the application need to be ported can be identified.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a software tool on a computing device, the computing device comprising a processor, the method comprising the acts:
    operating the processor to
        a) provide a plurality of application programs using a full functionality framework comprising a plurality of framework components implemented in software, wherein each of the plurality of framework components provides a function;
        b) automatically determine a frequency of use of each of the plurality of framework components in the plurality of application programs, the frequency of use of a selected component based on a number of times the selected component is used in the plurality of application programs; and
        c) construct a compact framework with reduced functionality having a sub-set of the framework components, the framework components in the sub-set selected based on the frequency of use determined in the act b), wherein at least one framework component from the full functionality framework is omitted from the compact framework with reduced functionality, wherein the compact framework does not perform the function of the at least one omitted framework component, wherein the compact framework has fewer namespaces and/or fewer framework components within at least one namespace as compared to the full functionality framework.

2. The method of claim 1, wherein the plurality of applications programs comprises classes and the act b) comprises determining the frequency of use of a selected component based on a percentage of classes that use the selected component and/or determining the frequency of use of a selected component based on a percentage of applications programs that use the selected component.

3. The method of claim 1, wherein the act a) comprises providing a plurality of application programs in an intermediate language.

4. The method of claim 3, wherein the act a) comprises providing a plurality of application programs in MSIL or an object oriented intermediate language.

5. A method of manufacturing a portable electronic device using the method of claim 1, the method further comprising the act:
    d) loading the compact framework in the portable electronic device.

6. The method of claim 5, additionally comprising the act:
e) loading into the portable electronic device an application program developed for execution on the framework.

7. A computer-readable medium having computer-executable instructions for performing acts comprising:
    a) identifying call instructions within at least one application program;
    b) determining whether each call instruction identified in the act a) is a call to a component in a full functionality framework for executing the at least one application program, wherein each framework component provides a function;

c) computing statistics representative of use of each of a plurality of components in the full functionality framework; and d) generating a compact framework with reduced functionality having a sub-set of the full functionality framework components, the full functionality framework components in the sub-set selected based on the statistics computed in the act c), wherein at least one framework component from the full functionality framework is omitted from the compact framework with reduced functionality, wherein the compact framework does not perform the function of the at least one omitted framework component, wherein the compact framework has fewer namespaces and/or fewer framework components within at least one namespace as compared to the full functionality framework.

8. The computer-readable medium of claim 7, wherein the computer-executable instructions for performing the act a) comprise an introspection tool.

9. The computer-readable medium of claim 7, wherein the computer-executable instructions for performing the act c) comprise computer-executable instructions for computing a number of times each of the plurality of components is called in the at least one application program.

10. The computer-readable medium of claim 7, wherein the at least one application program comprises a plurality of application programs and the computer-executable instructions for performing the act c) comprise computer-executable instructions for computing a number of applications in the plurality of application programs that call each of the plurality of components.

11. The computer-readable medium of claim 7, wherein the at least one application program comprises a plurality of classes and the computer-executable instructions for performing the act c) comprise computer-executable instructions for computing a number of classes in the plurality of classes that call each of the plurality of components.

12. A computer-readable medium having stored thereon:
a data structure comprising a plurality of records, each record comprising:
(a) at least one component data field containing data representing an identifier for a computer program component among a plurality of computer program components in a full functionality framework, wherein each of the plurality of computer program components provides a function; and (b) at least one usage data field containing data representing a frequency of use of the computer program component in the at least one component data field, the at least one usage data field comprising a first usage data field containing data representing a number of times the computer program component was called; and a software module comprising computer-executable instructions that, when executed, generate a compact framework with reduced functionality having a sub-set of the plurality of computer program components in the full functionality framework, the sub-set selected based at least in part on the data structure, wherein the compact framework only performs the functions of computer program components included in the sub-set of the plurality of computer program components, wherein the compact framework has fewer namespaces and/or fewer framework components within at least one namespace as compared to the full functionality framework.

13. The computer-readable medium of claim 12, wherein the at least one component data field comprises a class field containing data representing a class to which the computer program component belongs and a name field containing data representing a name by which the computer program component is accessed.

14. The computer-readable medium of claim 13, wherein each record represents a computer program component that is one of a method, property or event of a framework.

15. The computer-readable medium of claim 12, wherein the first usage data field contains data representing the number of times the computer program component was called in a set of application programs.

16. The computer-readable medium of claim 15, wherein the at least one usage data field comprises a second usage data field containing data representing a percentage of classes in a set of application programs that called the computer program component.

17. The computer-readable medium of claim 16, wherein the at least one usage data field comprises a third usage data field containing data representing a percentage of application programs in a set of application programs that called the computer program component.

18. The computer-readable medium of claim 12, wherein the data structure comprises an XML file.

* * * * *